(12) United States Patent
Wang

(10) Patent No.: US 10,652,631 B2
(45) Date of Patent: May 12, 2020

(54) SAMPLE ENTRIES AND RANDOM ACCESS

(71) Applicant: QUALCOMM Incorporated, San Diego, CA (US)

(72) Inventor: Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 339 days.

(21) Appl. No.: 15/602,988

(22) Filed: May 23, 2017

(65) Prior Publication Data

US 2017/0347166 A1   Nov. 30, 2017

Related U.S. Application Data

(60) Provisional application No. 62/340,886, filed on May 24, 2016.

(51) Int. Cl.

| | |
|---|---|
| *H04N 21/845* | (2011.01) |
| *H04N 21/854* | (2011.01) |
| *H04N 19/30* | (2014.01) |
| *H04N 21/2343* | (2011.01) |
| *H04N 19/70* | (2014.01) |
| *H04N 19/85* | (2014.01) |
| *H04L 29/06* | (2006.01) |
| *H04N 21/432* | (2011.01) |

(52) U.S. Cl.
CPC ....... *H04N 21/8451* (2013.01); *H04L 65/601* (2013.01); *H04N 19/30* (2014.11); *H04N 19/70* (2014.11); *H04N 19/85* (2014.11); *H04N 21/23439* (2013.01); *H04N 21/432* (2013.01); *H04N 21/8456* (2013.01); *H04N 21/85406* (2013.01)

(58) Field of Classification Search
None
See application file for complete search history.

(56) References Cited

U.S. PATENT DOCUMENTS

2015/0110192 A1* 4/2015 Wang ................... H04N 19/136
375/240.16
2017/0347165 A1   11/2017 Wang

OTHER PUBLICATIONS

ITU-T H.265, "Series H: Audiovisual and Multimedia Systems, Infrastructure of audiovisual services—Coding of moving video, Advanced video coding for generic audiovisual services," The International Telecommunication Union. Apr. 2015, 634 pp.

(Continued)

*Primary Examiner* — Heather R Jones
(74) *Attorney, Agent, or Firm* — Shumaker & Sieffert, P.A.

(57) ABSTRACT

In one example, a device for retrieving video data includes one or more processors configured to receive data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and in response to the sample entry type being 'hev1' or 'hev2' and the sample comprising the video data encoded according to one of HEVC or L-HEVC, retrieve the sample to perform random access using the sample, without retrieving the video data of any of the one or more other samples that precede the sample, and without retrieving parameter sets of any previous samples of the video bitstream in decoding order.

26 Claims, 7 Drawing Sheets

(56) References Cited

OTHER PUBLICATIONS

"Information technology—Coding of audio-visual objects—Part 15: Carriage of network abstraction layer (NAL) unit structured video in the ISO base media file format," International Standard Organization, ISO/IEC FDIS 14496-15-2014; Jan. 13, 2014, 179 pp.
"Information Technology—Coding of audio-visual objects—Part 12: ISO base media file format," International Standard Organization, ISO/IEC 14496-12, Third Edition, Oct. 15, 2008, 120 pp.
"Technical Specification Group Services and System Aspects; Transparent end-to-end packet switched streaming service (PSS); 3GPP file format (3GP)," 3rd Generation Partnership Project, Release 12, 3GPP TS 26.244 V9.1.0, Dec. 2013, 61 pp.
Tech et al., MV-HEVC Draft Text 3 (ISO/IEC 23008-2:201x/PDAM2), Joint Collaborative Team on 3D Video Coding Extension Development of ITU-T SG16 WP3 and ISO/IEC JTC1/SC29/WG11 3rd Meeting: Geneva, CH, Jan. 17-23, 2013, JCT3V-C1004_d3, 34 pp, Mar. 27, 2013.
Fielding et al., "Hypertext Transfer Protocol—HTTP/1.1," Network Working Group, Standards Track, RFC 2616, Jun. 1999, Retrieved from https://tools.ietf.org/html/rfc2616 on Feb. 23, 2017, 177 pp.
Paila et al., "Flute—File Delivery over Unidirectional Transport," Internet Engineering Task Force (IETF), Standards Track, RFC 6726, Nov. 2012, Retrieved from https://tools.ietf.org/html/rfc6726 on Feb. 23, 2017, 47 pp.
U.S. Appl. No. 15/602,962, filed May 23, 2017, first named inventor Ye-Kui Wang.
International Search Report and Written Opinion of International Application No. PCT/US2017/034290, dated Oct. 2, 2017, 17 pp.
Schierl et al., System Layer Integration of High Efficiency Video Coding, IEEE Transactions on Circuits and Systems for Video Technology, vol. 22, No. 12, Dec. 2012, pp. 1871-1884.
Wang et al., "Input on 14496-15 defect report", International Organisation for Standardisation ISO/IEC JTC1/SC29/WG11 Coding of Moving Pictures and Audio, ISO/IEC JTC1/SC29/WG11 N15929, Feb. 2016, San Diego, USA, 7 pp.
Wang., "Comments on ISO/IEC 14496-15", International Organisation for Standardisation ISO/IEC JTC1/SC29/WG11 Coding of Moving Pictures and Audio, ISO/IEC JTC1/SC29/WG11 MPEG2016/M38688, May-Jun. 2016, Geneva Switzerland, Qualcomm Incorporated, 14 pp.
14496-15 Editors., Disposition of Comments Report on ISO/IEC DIS 14496-15 (4th Ed), International Organisation for Standardisation, ISO/IEC JTC1/SC29/WG11 MPEG2016/N15927, Feb. 2016, La Jolla, USA, 42 pp.
M.M Hannuksela et al., "Miscellaneous comments on 4th edition of ISO/IEC 14496-15", International Organisation for Standardisation, ISO/IEC JTC1/SC29/WG11 MPEG2016/M38619, May/Jun. 2016, Geneva, CH, 6 pp.
Choi B., et al., "Text of ISO/IEC 23000-20 CD Omnidirectional Media Application Format," ISO/IEC JTC1/SC29/WG11 N16636, Jan. 2017, Geneva, Switzerland, 48 pages.
Hendry et al., "Comments on storage of tiled video in ISO/IEC 14496-15", 115, MPEG Meeting; May 5, 2016-Jun. 3, 2016; Geneva, (Motion Picture Expert Group or ISO/IEC JTC1/SC29/WG11), No. M38225r3, May 27, 2016, 7 pages, XP030066581.
"Information Technology—Coding of Audio-Visual Objects—Part 15: Carriage of Network Abstraction Layer (NAL) Unit Structured Video in the ISO Base Media File Format," International Standard Organization, ISO/IEC 14496-15, Fourth Edition, Feb. 2017, 158 Pages.
Response to Written Opinion filed in International Application No. PCT/US2017/034290 dated Mar. 22, 2018, 3 pp.
International Preliminary Report on Patentability issued in International Application No. PCT/US2017/034290 dated May 18, 2018, 8 pp.

\* cited by examiner

SAMPLE ENTRIES AND RANDOM ACCESS

This application claims the benefit of U.S. Provisional Application No. 62/340,886, filed May 24, 2016, the entire contents of which are hereby incorporated by reference.

TECHNICAL FIELD

This disclosure relates to file formats for storage and transport of media bitstreams, such as video bitstreams.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as the AVC file format.

SUMMARY

In general, this disclosure describes techniques for enabling convenient random access operations for files storing a single-layer or multi-layer bitstream in one or more tracks. This disclosure provides methods, devices, and computer program products on sample entry designs that enable convenient random access operations, for files storing a single-layer or multi-layer bitstream in one or more tracks.

In one example, a method of retrieving video data includes receiving data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and in response to the sample entry type being 'hev1' or 'hev2' and the sample comprising the video data encoded according to one of HEVC or L-HEVC, retrieving the sample to perform random access using the sample, without retrieving the video data of any of the one or more other samples that precede the sample, and without retrieving parameter sets of any previous samples of the video bitstream in decoding order.

In another example, a device for retrieving video data includes one or more processors configured to receive data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and in response to the sample entry type being 'hev1' or 'hev2' and the sample comprising the video data encoded according to one of HEVC or L-HEVC, retrieve the sample to perform random access using the sample, without retrieving the video data of any of the one or more other samples that precede the sample, and without retrieving parameter sets of any previous samples of the video bitstream in decoding order.

In another example, a device for retrieving video data includes means for receiving data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and means for retrieving the sample to perform random access using the sample in response to the sample entry type being 'hev1' or 'hev2' and the sample comprising the video data encoded according to one of HEVC or L-HEVC, without retrieving the video data of any of the one or more other samples that precede the sample, and without retrieving parameter sets of any previous samples of the video bitstream in decoding order.

In another example, a computer-readable storage medium having stored thereon instructions that, when executed, cause a processor to receive data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and in response to the sample entry type being 'hev1' or 'hev2' and the sample comprising the video data encoded according to one of HEVC or L-HEVC, retrieve the sample to perform random access using the sample, without retrieving the video data of any of the one or more other samples that precede the sample, and without retrieving parameter sets of any previous samples of the video bitstream in decoding order.

In another example, a method of generating a file including video data includes, in response to determining that a lowest track of a plurality of tracks, the lowest track including a base layer of video data carrying a lowest sub-layer of the video data, is to include sample entry type values for samples indicating that convenient random access is enabled, setting sample entry type values for samples of each of the other tracks of the plurality of tracks that include video data to indicate that convenient random access is enabled, and generating a file including the plurality of tracks, such that the sample entry type values for the tracks of the plurality of tracks indicate that convenient random access is enabled.

In another example, a device for generating a file including video data includes a memory configured to store video data; and one or more processors implemented in circuitry and configured to: in response to determining that a lowest track of a plurality of tracks, the lowest track including a base layer of the video data carrying a lowest sub-layer of the video data, is to include sample entry type values for samples indicating that convenient random access is enabled, set sample entry type values for samples of each of the other tracks of the plurality of tracks that include video data to indicate that convenient random access is enabled, and generate a file including the plurality of tracks, such that the sample entry type values for the tracks of the plurality of tracks indicate that convenient random access is enabled.

In another example, a device for generating a file including video data includes means for setting, in response to determining that a lowest track of a plurality of tracks, the lowest track including a base layer of video data carrying a lowest sub-layer of the video data, is to include sample entry type values for samples indicating that convenient random access is enabled, sample entry type values for samples of each of the other tracks of the plurality of tracks that include video data to indicate that convenient random access is enabled, and means for generating a file including the plurality of tracks, such that the sample entry type values for the tracks of the plurality of tracks indicate that convenient random access is enabled.

In another example, a computer-readable storage medium has stored thereon instructions that, when executed, cause a processor to, in response to determining that a lowest track of a plurality of tracks, the lowest track including a base layer of video data carrying a lowest sub-layer of the video data, is to include sample entry type values for samples indicating that convenient random access is enabled, set sample entry type values for samples of each of the other tracks of the plurality of tracks that include video data to indicate that convenient random access is enabled, and generate a file including the plurality of tracks, such that the sample entry type values for the tracks of the plurality of tracks indicate that convenient random access is enabled.

The details of one or more examples are set forth in the accompanying drawings and the description below. Other features, objects, and advantages will be apparent from the description and drawings, and from the claims.

DETAILED DESCRIPTION

Figure 1:
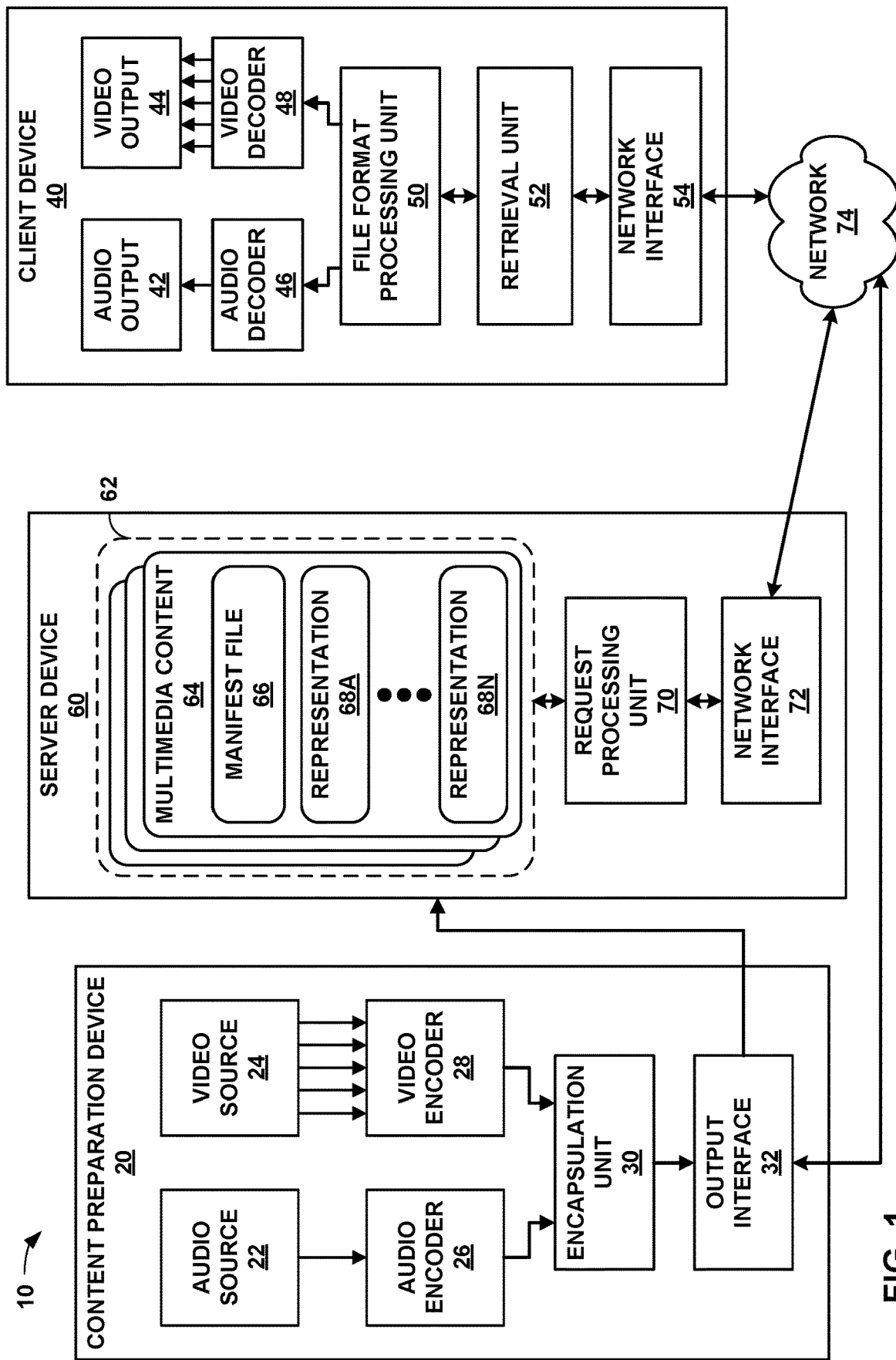
FIG. 1 is a block diagram illustrating an example system that implements techniques for streaming media data over a network.

In general, this disclosure describes techniques for enabling convenient random access operations for files storing a single-layer or multi-layer bitstream in one or more tracks. Convenient random access may be defined as random access without requiring searching and/or fetching parameter sets from earlier samples. In other words, convenient random access is enabled for a sample of a video bitstream when a client device can request the sample and subsequent samples without searching for and/or fetching parameter sets of earlier samples. Thus, all necessary parameter sets may be included in either the sample itself or in a sample entry that corresponds to the sample.

This disclosure describes methods on sample entry designs that enable convenient random access operations, for files storing a single-layer or multi-layer bitstream in one or more tracks.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC).

File format standards include ISO base media file format (ISOBMFF, ISO/IEC 14496-12), and other derived from the ISOBMFF, including MPEG-4 file format (ISO/IEC 14496-15), 3GPP file format (3GPP TS 26.244), and ISO/IEC 14496-15 that contains the file formats for AVC and its extensions as well as the file formats for HEVC and its extensions. The draft texts of recent new editions for ISO/IEC 14496-12 and 14496-15 are available at http://phenix.int-evey.fr/mpeg/doc_end_user/documents/111_Geneva/wg11/w15177-v6-w15177.zip and http://wg11.sc29.org/doc_end_user/documents/114_San%20Diego/wg11/w15928-v2-w15928.zip, respectively.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to file format processing unit 50. File format processing unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and file format processing unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or file format processing unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to file format processing unit 50, via retrieval unit 52. File format processing unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Content preparation device 20 (via, e.g., encapsulation unit 30) and client device 40 (via e.g., file format processing unit 50) may utilize one or multiple of many file formats to encapsulate and/or decapsulate video content. The ISOBMFF is used as the basis for many codec encapsulation formats, such as the AVC file format, as well as for many multimedia container formats, such as the MPEG-4 file format, the 3GPP file format (3GP), and the DVB file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is the elementary syntax structure in the ISOBMFF, including a four-character coded box type, the byte count of the box, and the payload. An ISOBMFF file consists of a sequence of boxes, and boxes may contain other boxes. A Movie box ("moov") contains the metadata for the continuous media streams that is present in the file, each one represented in the file as a track. The metadata for a track is enclosed in a Track box ("trak"), while the media content of a track is either enclosed in a Media Data box ("mdat") or directly in a separate file. The media content for tracks consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g. for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

The ISOBMFF specification specifies six types of Stream Access Points (SAPs) for use with DASH. The first two SAP types (types 1 and 2), correspond to IDR pictures in H.264/AVC and HEVC. The third SAP type (type 3) corresponds to open-GOP random access points hence BLA or CRA pictures in HEVC. The fourth SAP type (type 4) corresponds to GDR random access points.

In ISO/IEC 14496-15, various sample entry types (also referred to as sample entry names) are specified.

In the HEVC file format (clause 8 of ISO/IEC 14496-15), the sample entry types 'hvc1' and 'hev1' are specified. A constraint for the sample entry type 'hev1' is specified as follows:

When the sample entry name is 'hev1', the following applies:

If the sample is a random access point, all parameter sets needed for decoding that sample shall be included either in the sample entry or in the sample itself.

Otherwise (the sample is not a random access point), all parameter sets needed for decoding the sample shall be included either in the sample entry or in any of the samples since the previous random access point to the sample itself, inclusive.

The purpose of this constraint is also to enable convenient random access, from sample that is a random access point without the need of searching and fetching parameter sets from earlier samples.

In the layered HEVC (L-HEVC) file format (clause 9 of ISO/IEC 14496-15), the sample entry types 'hvc2', 'hev2', 'lhv1' and, 'lhe1' are specified. A constraint for the sample entry type 'lhe1' is specified as follows:

When the sample entry name is 'lhe1', the following applies:

The constraints below impose restrictions on placement of out-of-band parameter sets (in sample entries) and in-band parameter sets (in samples), in order to enable convenient random access from access units containing IRAP pictures at least in some layers. With these constraints, a file reader that initializes with the sample entries and rolls forward from an access unit wherein all pictures are IRAP pictures will have all the parameter sets it needs.

For any particular sample in a particular track, the temporally collocated sample in another track is defined as the one with the same decoding time as that of this particular sample.

For an IRAP picture of a given sample, track and layer, each parameter set needed for decoding the IRAP picture shall be included in one of the following:
  a. the sample entry that applies to the given sample in the given track
  b. the sample entry of the initial sample of a track carrying a reference layer of the given layer, where the initial sample is either the given sample's temporally collocated sample, when the temporally collocated sample contains an IRAP picture of the reference layer, or the previous sample that contains an IRAP picture of the reference layer
  c. the given sample itself, possibly by using extractors
  d. when present, any temporally collocated sample of the tracks carrying reference layers of the given layer, possibly by using extractors For a non-IRAP picture of a given sample, track and layer, each parameter set needed for decoding that picture shall be included in one of the following:
  a. the sample entry that applies to the given sample in the given track
  b. the sample entry of the initial sample of a track carrying a reference layer of the given layer, where the initial sample is either the given sample's temporally collocated sample, when the temporally collocated sample contains an IRAP picture of the reference layer, or the previous sample that contains an IRAP picture of the reference layer
  c. any of the samples in the given track since the previous sample containing an IRAP picture in the given layer to the given sample itself, inclusive, possibly by using extractors
  d. when present, any of the samples in a track carrying a reference layer of the given layer since the temporally collocated sample of the previous sample containing an IRAP picture in the given layer to the temporally collocated sample of the given sample, inclusive, possibly by using extractors The purpose of this constraint is also to enable convenient random access, but for bitstreams containing multiple layers, as described in detail above as part of the description of the constraint.

Table 10 of ISO/IEC 14496-15 (copied below) shows all the possible uses of sample entries, configurations and the L-HEV C tools for HEVC and L-HEVC tracks:

| Sample Entry Name | With Configuration Records | Meaning |
|---|---|---|
| 'hvc1' or 'hev1' | HEVC Configuration Only | A plain HEVC track without NAL units with nuh_layer_id greater than 0; Extractors and aggregators shall not be present. |
| 'hvc1' or 'hev1' | HEVC and L-HEVC Configurations | An L-HEVC track with both NAL units with nuh_layer_id equal to 0 and NAL units with nuh_layer_id greater than 0; Extractors and aggregators shall not be present. |
| 'hvc2' or 'hev2' | HEVC Configuration Only | A plain HEVC track without NAL units with nuh_layer_id greater than 0; Extractors may be present and used to reference NAL units; Aggregators may be present to contain and reference NAL units. |
| 'hvc2' or 'hev2' | HEVC and L-HEVC Configurations | An L-HEVC track with both NAL units with nuh_layer_id equal to 0 and NAL units with nuh_layer_id greater than 0; Extractors and aggregators may be present; Extractors may reference any NAL units; Aggregators may both contain and reference any NAL units. |
| 'lhv1', 'lhe1' | L-HEVC Configuration Only | An L-HEVC track with NAL units with nuh_layer_id greater than 0 and without NAL units with nuh_layer_id equal to 0; Extractors may be present and used to reference NAL units; Aggregators may be present to contain and reference NAL units. | cated sample, when the temporally collocated sample contains an IRAP picture of the reference layer, or the previous sample that contains an IRAP picture of the reference layer This disclosure recognizes that current designs of sample entry types in the file formats for HEVC and L-HEVC (e.g., in clauses 8 and 9 of ISO/IEC 14496-15) may present various problems. For example:

To describe a first potential problem, it is noted that row 2 of Table 10 of ISO/IEC 14496-15 states:

| 'hvc1' or 'hev1' | HEVC and L-HEVC Configurations | An L-HEVC track with both NAL units with nuh_layer_id equal to 0 and NAL units with nuh_layer_id greater than 0; Extractors and aggregators shall not be present. |
|---|---|---|

Meanwhile, row 4 of Table 10 of ISO/IEC 14496-15 states:

| 'hvc2' or 'hev2' | HEVC and L-HEVC Configurations | An L-HEVC track with both NAL units with nuh_layer_id equal to 0 and NAL units with nuh_layer_id greater than 0; Extractors and aggregators may be present; Extractors may reference any NAL units; Aggregators may both contain and reference any NAL units. |
|---|---|---|

When the sample entry type is 'hvc1', 'hev1', 'hvc2', or 'hev2', and the same entry contains both HEVC and L-HEVC configurations, the track carries data of both the base layer and one or more enhancement layers.

However, the constraint that enables convenient random access but for bitstreams containing multiple layers is only specified for the sample entry type 'lhe1'. This means that when a multi-layer L-HEVC bitstream is stored using any of sample entry types 'hvc1', 'hev1', 'hvc2', and 'hev2', there is no way to guarantee and indicate that convenient random access (without needing of searching and fetch parameter sets from earlier samples, and so on) is enabled.

The techniques of this disclosure may be used to address the first potential problem discussed above. In particular, in one example, a constraint to enable convenient random access, without needing of searching and fetch parameter sets from earlier samples for a track containing data of multiple layers, is specified for the sample entry types 'hev1' and 'hev2' when the sample entry contains both HEVC and L-HEVC configurations. Thus, content preparation device 20 may ensure that necessary parameter sets are provided with sample entries and/or samples having sample entry types of 'hev1' and 'hev2', such that no searching and fetching of parameter sets from earlier samples is required. Likewise, client device 40 may retrieve a sample entry and sample having a sample entry type of 'hev1' or 'hev2' and perform random access, without retrieving parameter sets of any previous samples in video decoding order.

To describe a second potential problem, it is noted that row 3 of Table 10 of ISO/IEC 14496-15 states:

| 'hvc2' or 'hev2' | HEVC Configuration Only | A plain HEVC track without NAL units with nuh_layer_id greater than 0; Extractors may be present and used to reference NAL units; Aggregators may be present to contain and reference NAL units. |
|---|---|---|

When the sample entry type is 'hvc2' or 'hev2', and the same entry contains the HEVC configuration only, either of the following scenarios may occur: (1) The track carries an entire single-layer HEVC bitstream wherein VCL NAL units all have nuh_layer_id equal to 0, and there are some extractors and/or aggregators present; or (2) The track carries a subset of such a single-layer HEVC bitstream and the subset contains VCL NAL units having TemporalId greater than 0 only (regardless whether there are extractors and/or aggregators).

However, neither of the sample entry types 'hvc2' and 'hev2' has been constrained to enable convenient random access similarly as for the sample entry type 'hev1'. This means that for the above two scenarios, there is no way to guarantee and indicate that convenient random access (without needing of searching and fetch parameter sets from earlier samples) is enabled.

This disclosure also describes techniques that may be used to solve the second potential problem. In particular, a constraint may be specified to enable convenient random access, without needing of searching and fetch parameter sets from earlier samples for a track containing only an entire single-layer HEVC bitstream or a subset thereof, that the sample entry type 'hev2' is to be used when the sample entry contains only the HEVC configuration. Thus, when the sample entry contains only the HEVC configuration, content preparation device 20 may specify a sample entry type of 'hev2.' Likewise, client device 40 may determine that convenient random access is enabled for a sample having sample entry type 'hev2,' and moreover, that the sample includes video data encoded according to only the HEVC configuration, rather than the L-HEVC configuration.

To describe a third potential problem, it is noted that, when each entire layer of a multi-layer L-HEVC bitstream is stored in a separate track, according to the current specification, it is possible that the base track uses the sample entry type 'hev1' with the HEVC configuration only, and other tracks use the sample entry type 'lhv1' with the L-HEVC configuration only, and it is also possible that the base track uses the sample entry type 'hvc1' with the HEVC configuration only, and other tracks use the sample entry type 'lhe1' with the L-HEVC configuration only.

In the first scenario, convenient random access is indicated for the base track, but not for other tracks. In the second scenario, convenient random access is not indicated for the base track, but is indicated for other tracks. There might be a plausible excuse for the first scenario, such as the base track is important enough to justify the overhead of enabling convenient random access while the compromise of giving up convenient random access for less overhead for the tracks carrying enhancement layers is considered a good tradeoff. However, the second scenario does not make sense as enabling convenient random access for the tracks carrying enhancement layers would effectively require enabling convenient random access for the base track, and if it is enabled for the base track, there is no reason not to indicate it by using the right sample entry type, i.e., 'hev1'.

Similarly, the third potential problem may also apply when a single-layer HEVC bitstream containing multiple temporal sub-layers is carried by multiple tracks, where the track carrying the lowest sub-layer (the VCL NAL units of which have TemporalId equal to 0) uses a sample entry type that indicates convenient random access being enabled while other track uses a sample entry type that does not indicate convenient random access being enabled, or vice versa.

The techniques of this disclosure may also address the third potential problem. In particular, a constraint may be specified to require that, for all tracks carrying a single-layer or multi-layer bitstream (coded by HEVC, L-HEVC, or any other codecs), either all tracks use the sample entry types (together with the presence of HEVC and/or L-HEVC configurations) that indicate convenient random access being enabled or all tracks use the sample entry types (together with the presence of HEVC and/or L-HEVC configurations) that do not indicate convenient random access being enabled. Thus, content preparation device 20 may ensure, for tracks carrying a single-layer or multi-layer bitstream, that either all of the tracks use the sample entry types that indicate that convenient random access is enabled, or that all of the tracks use sample entry types that indicate that convenient random access is not enabled. In this manner, if convenient random access is enabled for one of the tracks, client device 40 may determine that convenient random access is enabled for each of the tracks.

Alternatively, a constraint may be specified to require that, for all tracks carrying a single-layer or multi-layer bitstream (coded by HEVC, L-HEVC, or any other codecs), when the track that carries the lowest sub-layer (the VCL NAL units of which have TemporalId equal to 0) of the base layer uses a sample entry type (together with the presence of HEVC and/or L-HEVC configurations) that indicates convenient random access being enabled, all other tracks shall use sample entry types (together with the presence of HEVC and/or L-HEVC configurations) that indicate convenient random access being enabled. Thus, content preparation device 20 may ensure, for tracks carrying a single-layer or multi-layer bitstream, that when a track that carries a lowest temporal sub-layer of the base layer uses a sample entry type that indicates that convenient random access is enabled, that all of the tracks use the sample entry type indicating that convenient random access is enabled, or alternatively, that if convenient random access is not enabled for the lowest temporal sub-layer of the base layer, that none of the tracks use sample entry types that indicate that convenient random access is enabled. In this manner, if convenient random access is enabled for a track including the lowest temporal sub-layer of the base layer, client device 40 may determine that convenient random access is enabled for each of the tracks.

Client device 40 may use the techniques of this disclosure to perform convenient random access in various ways. For example, client device 40 may perform convenient random access by requesting data from server device 60 using a network streaming protocol, such as DASH. In other examples, client device 40 may use the techniques of this disclosure to perform convenient random access to retrieve media data from a fixed computer-readable storage medium, such as a digital versatile disc, Blu-ray disc, hard drive, flash memory, or the like. Thus, although FIG. 1 illustrates an example including network based streaming, it should be understood that the techniques of this disclosure may be applied in other scenarios and contexts as well.

Figure 2:
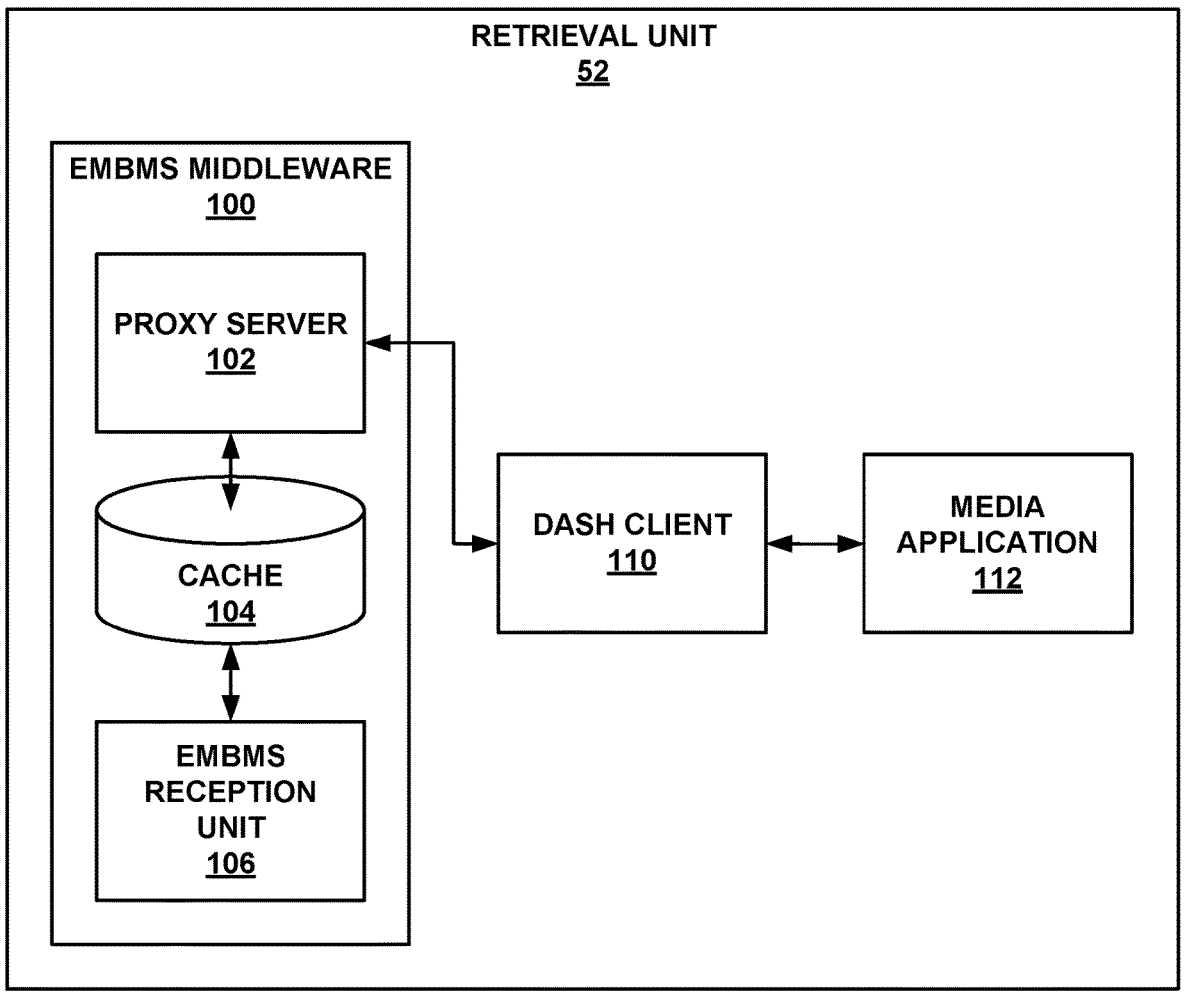
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 3:
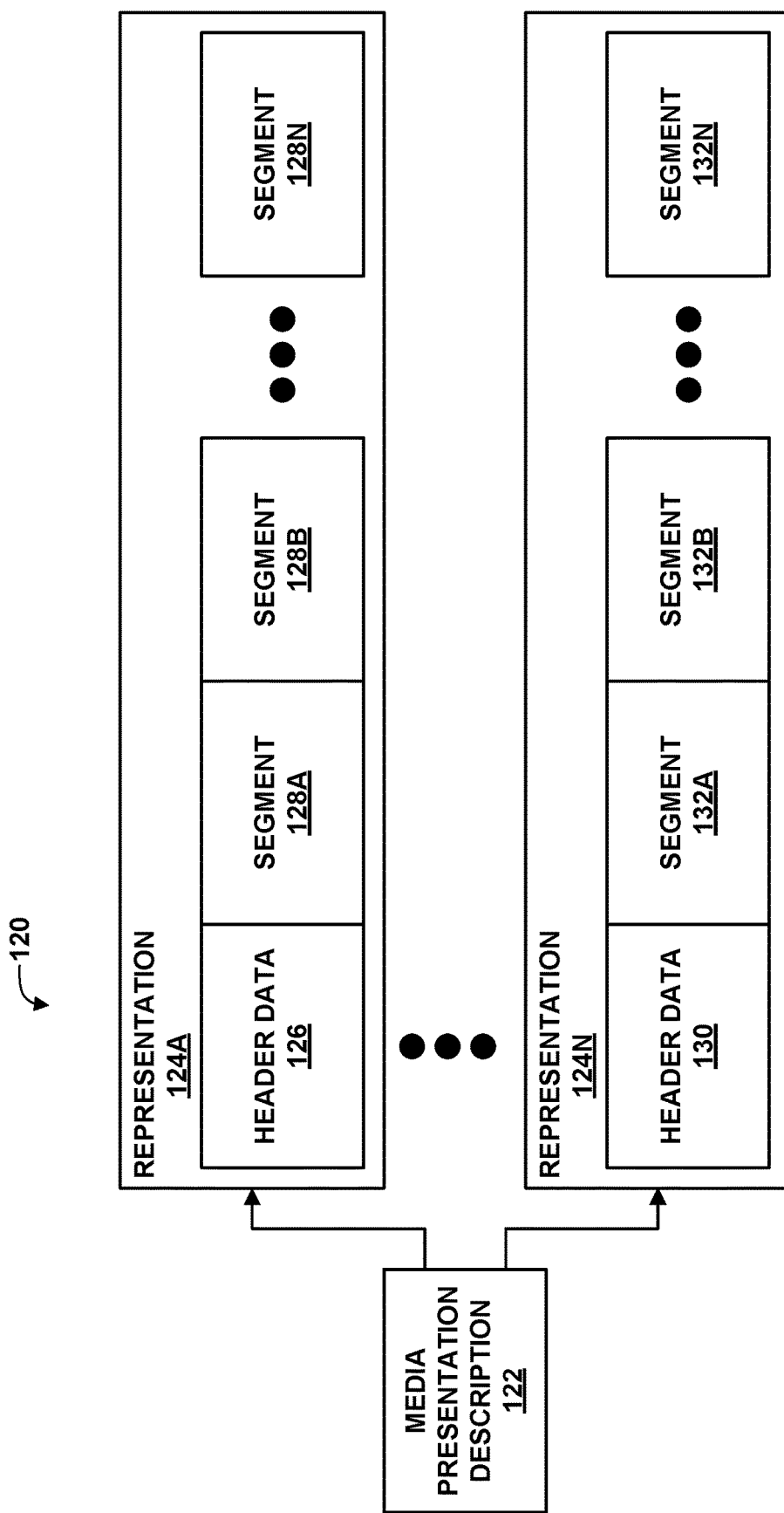
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
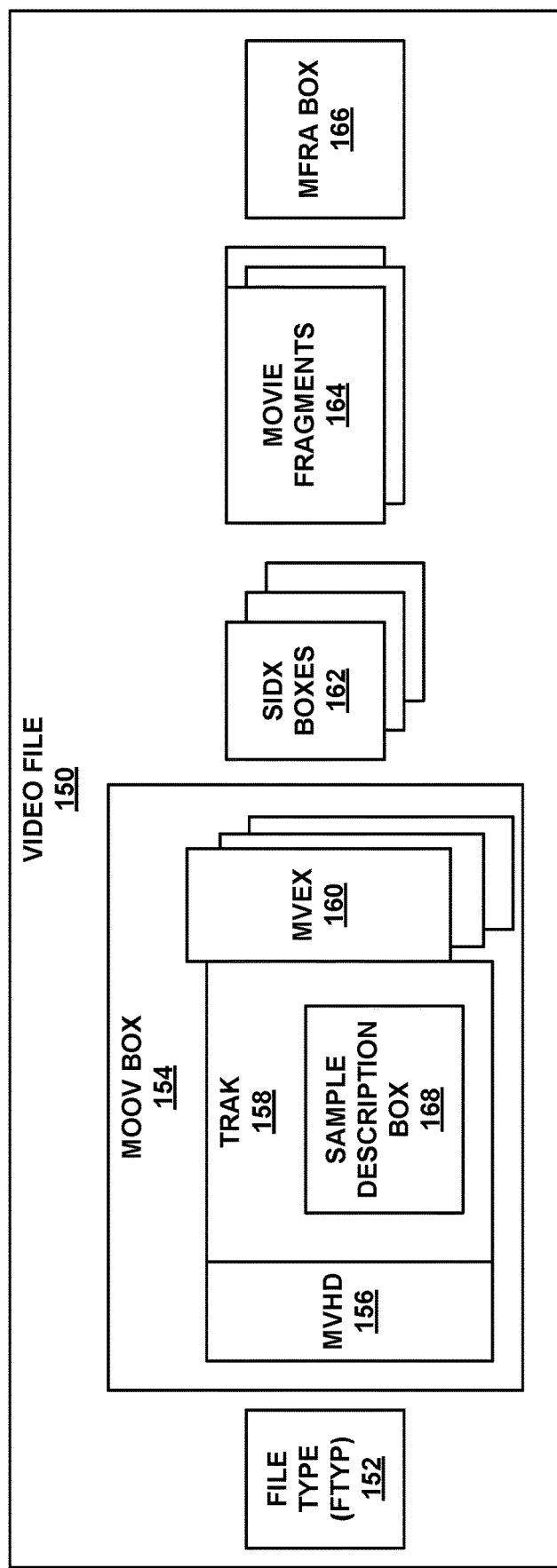
FIG. 4 is a block diagram illustrating elements of an example video file.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
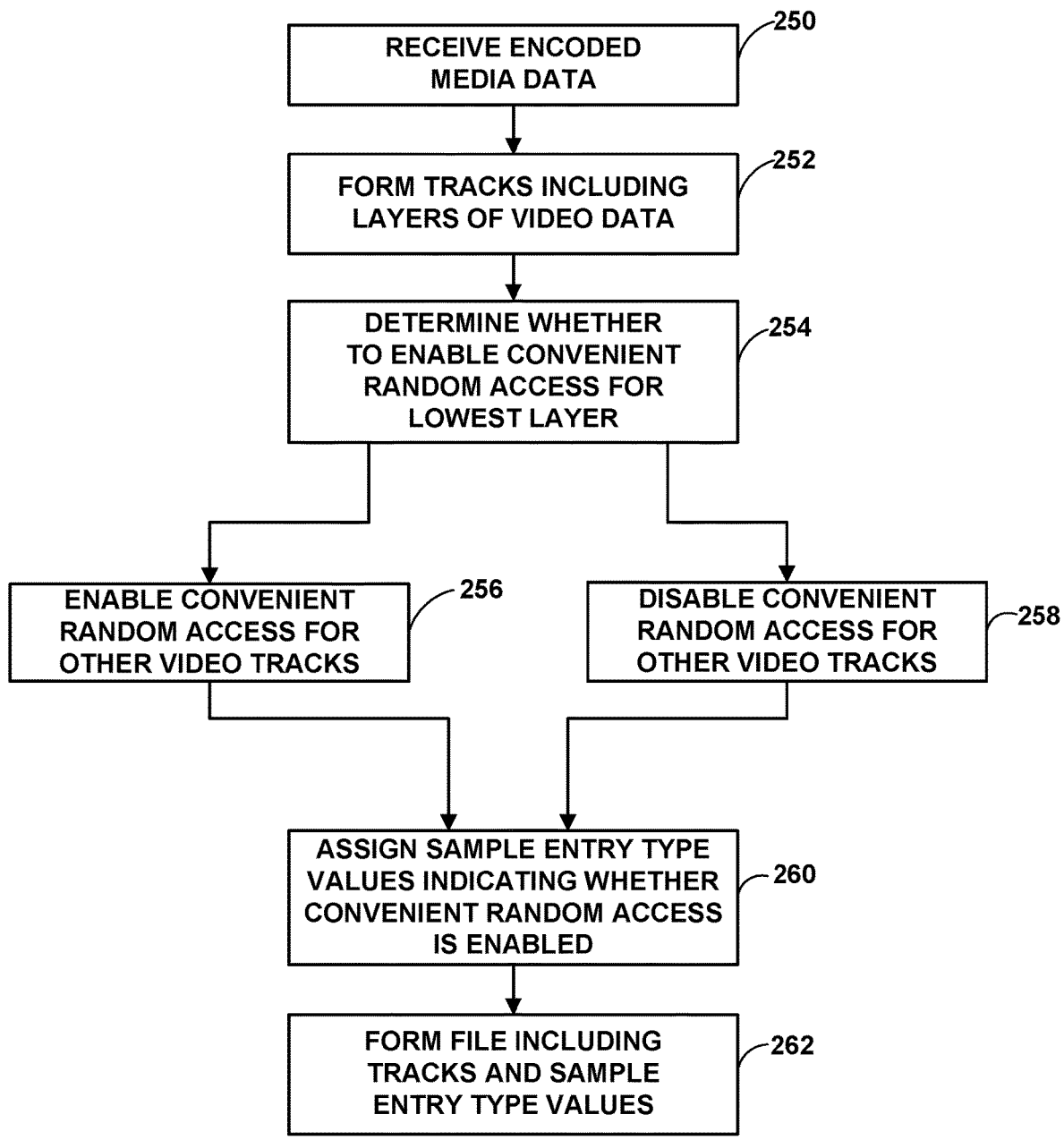
FIG. 7 is a flowchart illustrating an example technique of generating a file including video data.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 150 also contains sample description box 168, in this example. In particular, sample description box 168 is included within TRAK box 158, in this example. An example sample description box 168 may be defined as follows:

Sample Entry and Box Types: 'hvc2', 'hev2', 'lhe1', 'lhvC'
  Container: Sample Description Box ('stsd')
  Mandatory: An 'hvc1', 'hev1', 'hvc2', 'hev2', or 'lhe1' sample entry is mandatory
  Quantity: One or more sample entries may be present In this example definition for sample description box 168, when the sample entry name is 'lhv1' the default and mandatory value of array_completeness is 1 for arrays of all types of parameter sets, and 0 for all other arrays. When the sample entry name is 'lhe1', the default value of array_completeness is 0 for all arrays.

In this example definition for sample description box 168, when the sample entry name is 'hev2' and the sample entry contains the HEVC configuration only, the same constraints as specified in clause 8.4.3 for the sample entry name 'hev1' apply.

In this example definition for sample description box 168, when the sample entry name is 'lhe1', or when the sample entry name is 'hev1' or 'hev2' and the sample entry contains both HEVC and L-HEVC configurations, the following applies:

The example constraints below impose restrictions on placement of out-of-band parameter sets (in sample entries) and in-band parameter sets (in samples), in order to enable convenient random access from access units containing IRAP pictures at least in some layers. With these constraints, a file reader that initializes with the sample entries and rolls forward from an access unit wherein all pictures are IRAP pictures will have all the parameter sets it needs.

In this example definition for sample description box 168, for any particular sample in a particular track, the temporally collocated sample in another track is defined as the one with the same decoding time as that of this particular sample.

In this example definition for sample description box 168, for an IRAP picture of a given sample, track and layer, each parameter set needed for decoding the IRAP picture shall be included in one of the following:
  a. the sample entry that applies to the given sample in the given track
  b. the sample entry of the initial sample of a track carrying a reference layer of the given layer, where the initial sample is either the given sample's temporally collocated sample, when the temporally collocated sample contains an IRAP picture of the reference layer, or the previous sample that contains an IRAP picture of the reference layer
  c. the given sample itself, possibly by using extractors
  d. when present, any temporally collocated sample of the tracks carrying reference layers of the given layer, possibly by using extractors In this example definition for sample description box 168, for a non-IRAP picture of a given sample, track and layer, each parameter set needed for decoding that picture shall be included in one of the following:
  a. the sample entry that applies to the given sample in the given track
  b. the sample entry of the initial sample of a track carrying a reference layer of the given layer, where the initial sample is either the given sample's temporally collocated sample, when the temporally collocated sample contains an IRAP picture of the reference layer, or the previous sample that contains an IRAP picture of the reference layer
  c. any of the samples in the given track since the previous sample containing an IRAP picture in the given layer to the given sample itself, inclusive, possibly by using extractors
  d. when present, any of the samples in a track carrying a reference layer of the given layer since the temporally collocated sample of the previous sample containing an IRAP picture in the given layer to the temporally collocated sample of the given sample, inclusive, possibly by using extractors In this example definition for sample description box 168, for an HEVC or L-HEVC bitstream carried in more than one track, when the sample entry name of the base track is 'hvc1' or 'hvc2', the sample entry name of other tracks shall be 'hvc2' or and when the sample entry name of the base track is 'hev1' or 'hev2', the sample entry name of other tracks shall be 'hev2' or 'lhe1'. The base track is the track with the lowest temporal sub-layer (the VCL NAL units of which have TemporalId equal to 0) of the base layer natively present.

The above constraint, in this example, requires convenient random access to be enabled and indicated for either all tracks carrying an HEVC or L-HEVC bitstream or none of the tracks.

If the samples of a track contain an HEVC compatible base layer, then an 'hvc1', 'hev1', 'hvc2', or 'hev2' sample entry shall be used, in this example. Here, the entry shall contain initially an HEVC Configuration Box, possibly followed by an L-HEVC Configuration Box as defined below. The HEVC Configuration Box documents the Profile, Tier, Level, and possibly also parameter sets of the HEVC compatible base layer as defined by the HEVCDecoderConfigurationRecord. The L-HEVC Configuration Box possibly documents parameter sets of the L-HEVC compatible enhancement layers as defined by the LHEVCDecoderConfigurationRecord, stored in the L-HEVC Configuration Box.

If the samples of a track do not contain an HEVC base layer, then the sample entry type 'lhv1' or 'lhe1' shall be used and the sample entry shall contain an L-HEVC Configuration Box, as defined below. This includes an HEVC-DecoderConfigurationRecord, as defined in, e.g., ISO/IEC 14496-15.

Figure 5:
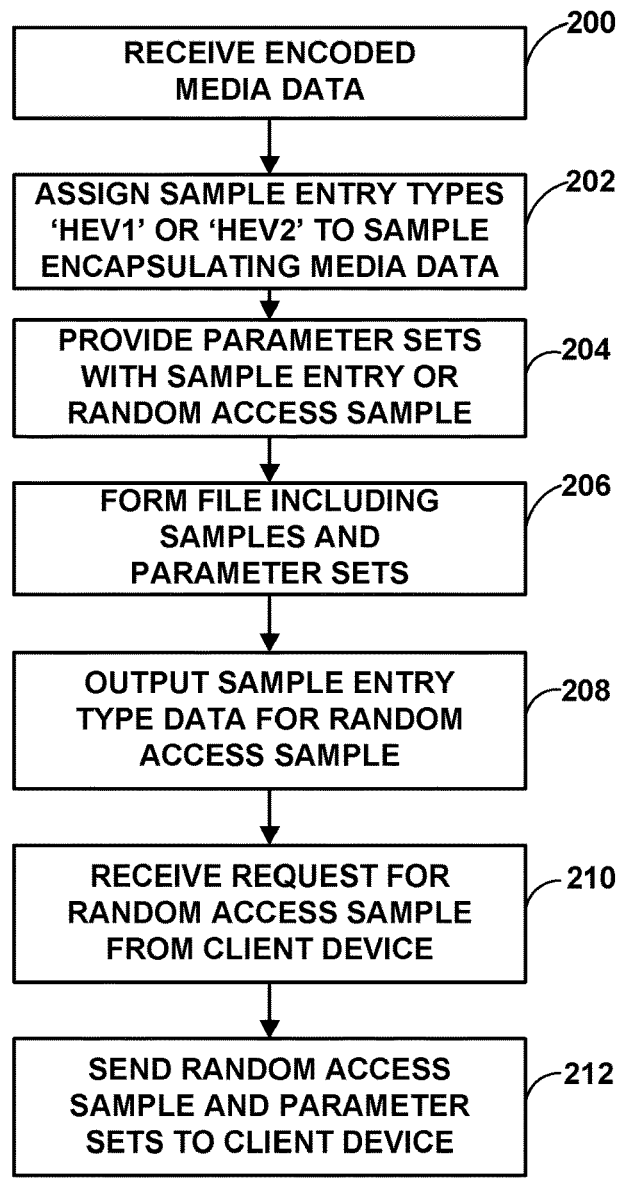
FIG. 5 is a flowchart illustrating an example technique of processing data.

FIG. 5 is a flowchart illustrating an example method of forming and sending media data in accordance with the techniques of this disclosure. The method of FIG. 5 may be performed by, e.g., content preparation device 20 of FIG. 1 and/or server device 60 of FIG. 1, a device that is configured to perform the functionality attributed to content preparation device 20 and server device 60, or the like. For purposes of explanation, the techniques of FIG. 5 are discussed with respect to both content preparation device 20 and server device 60.

Initially, encapsulation unit 30 receives encoded media data from, e.g., audio encoder 26 and/or video encoder 28 (200). In this example, encapsulation unit 30 encapsulates video data in various samples, some of which represent random access samples. The video data may be encoded as HEVC or L-HEVC. To enable convenient random access, encapsulation unit 30 assigns sample entry type values of 'hev1' or 'hev2' to samples encapsulating random access point media data (202), and also provides parameter sets with the sample entry or random access samples (204). The random access points may correspond to instantaneous decoder refresh (IDR) frames, which may correspond to frames encoded using intra-prediction (I-frames). The parameter sets may include any or all of video parameter sets (VPS), sequence parameter sets (SPSs), and/or picture parameter sets (SPSs). In general, encapsulation unit 30 may ensure that all necessary parameter sets are provided with the random access samples and/or with sample entries corresponding to the random access samples, to enable convenient random access.

Encapsulation unit 30 may then form one or more files, e.g., according to ISO/IEC 14496-15, including the samples and the parameter sets (206). In particular, encapsulation unit 30 may form the files such that the parameter sets are included with the sample entry types 'hev1' or 'hev2' and/or the samples corresponding to these sample entry types, to enable convenient random access. Content preparation device 20 may then output sample entry type data for a random access sample (208). In some examples, this output may be to a fixed medium, such as a digital versatile disc (DVD) or Blu-ray disc, together with the rest of the file(s). In other examples, this output may be sent to server device 60, which may then send the sample entry type data to a client device, such as client device 40 of FIG. 1.

In the example of FIG. 5, server device 60 sends the sample entry type data to client device 40, which causes client device 40 to perform convenient random access. Thus, request processing unit 70 of server device 60 of FIG. 1 receives a request for a random access sample, for which a sample entry type is 'hev1' or 'hev2,' from client device 40 (210). In response, request processing unit 70 sends the requested random access sample and the parameter sets (VPS, SPS, and/or PPS) to client device 40 (212). In particular, this data may be arranged such that the parameter sets are placed with the sample entry data or with the sample corresponding to the sample entry data, such that client device 40 need not search for and fetch parameter sets of earlier samples than the random access sample. In this manner, the techniques of FIG. 5 may enable convenient random access for client device 40, thereby reducing processing requirements for server device 60 and client device 40, reduce bandwidth consumption for this data exchange compared to if convenient random access were not enabled, and improve latency between a time at which client device 40 receives input requesting media data from a user and the time client device 40 can present the requested media data to the user.

Figure 6:
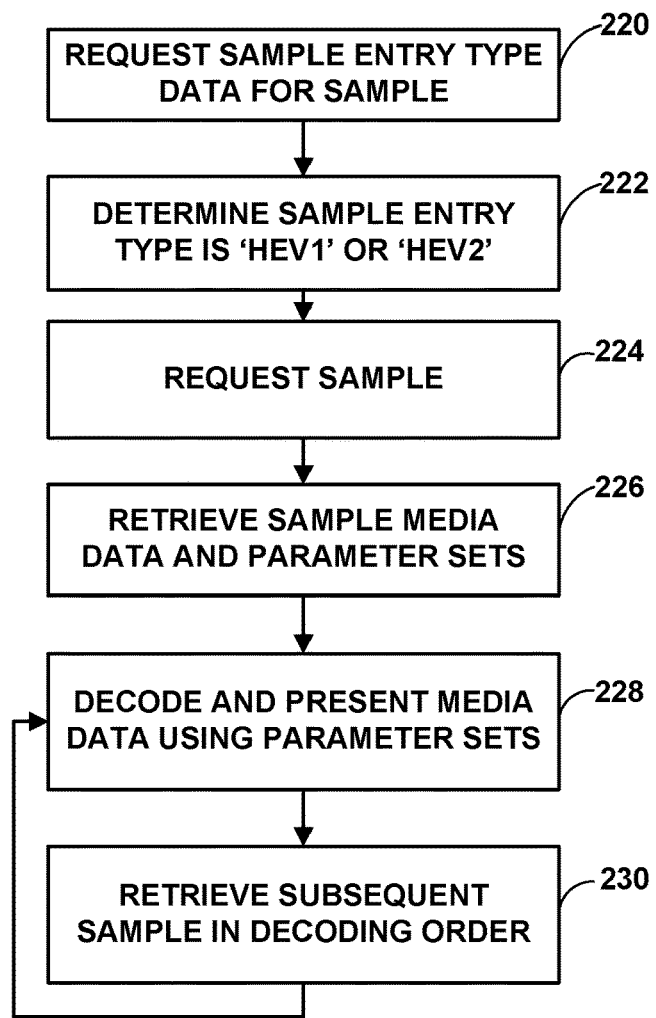
FIG. 6 is a flowchart illustrating an example technique of processing data.

FIG. 6 is a flowchart illustrating an example method of performing random access in accordance with the techniques of this disclosure. For purposes of example, the method of FIG. 6 is explained with respect to client device 40 of FIG. 1.

In this example, retrieval unit 52 of client device 40 initially requests sample entry type data for a random access point sample (220). For example, retrieval unit 52 may send an HTTP request for the sample entry type data according to DASH. After receiving the sample entry type data, file format processing unit 50 of client device 40 determines that the sample entry type data indicates a sample entry type of 'hev1' or 'hev2' (222) for an associated sample including video data encoded according to, e.g., one of HEVC or L-HEVC. Accordingly, client device 40 may determine that the sample can be used for convenient random access. That is, client device 40 may retrieve the sample and parameter sets included with media data of the sample or with the sample entry for the sample, without searching for and fetching parameter sets of earlier samples in decoding order. It should be understood that in this example, the video bitstream including the sample also includes one or more other samples earlier than the sample in decoding order.

In response, client device 40 retrieves the sample media data and the corresponding parameter sets (226). Client device 40 need not search for and fetch parameter sets of earlier samples, but instead, the retrieved parameter sets include all parameter set data needed for decoding media data of the retrieved sample, due to convenient random access. Therefore, file format processing unit 50 decapsulates video data from a file including the retrieved sample, and provides the decapsulated media data to video decoder 48. Video decoder 48 decodes the video data using the parameter sets, and provides the decoded video data to video output 44, which presents the media data (228). Retrieval unit 52 may further request a subsequent sample in decoding order (230), and video decoder 48 may then decode video data of the subsequent sample and video output 44 may present the decoded video data. This process may continue until an end of the corresponding media presentation, or until a new set of media data is requested, e.g., by a user.

In this manner, the method of FIG. 6 represents an example of a method of processing video data, including receiving data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, and in response to the sample entry type being 'hev1' or 'hev2' and the sample comprising the video data encoded according to one of HEVC or L-HEVC, retrieving the sample to perform random access using the sample, without retrieving the video data of any of the one or more other samples that precede the sample, and without retrieving parameter sets of any previous samples of the video bitstream in decoding order.

FIG. 7 is a flowchart illustrating an example technique of generating a file including video data. The method of FIG. 7 is described as being performed by encapsulation unit 30 of FIG. 1. However, it should be understood that, in general, the method of FIG. 7 may be performed by other devices as well, e.g., by components of server device 60. Moreover, the techniques of FIG. 7 may be performed in conjunction with the file generation techniques of FIG. 5 as discussed above.

Initially, encapsulation unit 30 receives encoded media data (250). Encapsulation unit 30 may receive the encoded media data from, e.g., video encoder 28, which may encode the media data according to HEVC, L-HEVC, or another such video coding standard. In particular, the encoded media data may include a plurality of layers, e.g., for MV-HEVC, 3D-HEVC, SHVC, or the like (such as layered extensions to other video encoding standards).

Encapsulation unit 30 may generally form a file including the encoded media data in the form of a plurality of tracks. Encapsulation unit 30 may form tracks of the file such that each track including video data includes one or more layers of multi-layer video data (252). Multiple layers within a track may correspond to, for example, various temporal scalability layers. Tracks including distinct layers may correspond to, for example, distinct views for MV-HEVC or 3D-HEVC, or different scalability layers for SHVC (e.g., spatial resolution scalability, bit depth scalability, peak signal to noise ratio (PSNR) scalability, or the like).

In the example of FIG. 7, encapsulation unit 30 then determines whether to enable convenient random access (254). For example, encapsulation unit 30 may receive configuration data from a user, such as an administrator. In accordance with the restriction proposed in this disclosure, when convenient random access is enabled for a lowest track of a plurality of tracks, the lowest track including a base layer of video data carrying a lowest sub-layer of the video data, encapsulation unit 30 enables convenient random access for each other track of the plurality of tracks that includes video data (256). Alternatively, if convenient random access is disabled for the lowest track, encapsulation unit 30 disables convenient random access for the other tracks of the plurality of tracks (258). In other examples, encapsulation unit 30 may enable or disable convenient random access according to the alternative constraint discussed above (i.e., for all tracks carrying a single-layer or multi-layer bitstream (coded by HEVC, L-HEVC, or any other codecs), when the track that carries the lowest sub-layer (the VCL NAL units of which have TemporalId equal to 0) of the base layer uses a sample entry type (together with the presence of HEVC and/or L-HEVC configurations) that indicates convenient random access being enabled, all other tracks shall use sample entry types (together with the presence of HEVC and/or L-HEVC configurations) that indicate convenient random access being enabled).

Encapsulation unit 30 then assigns sample entry type values indicating whether convenient random access is enabled to sample entries for samples of the tracks including video data (260). For example, 'hev1' and 'hev2' as sample entry type values may indicate that convenient random access is enabled for the tracks including video data. Encapsulation unit 30 also forms a file including the tracks and sample entry type values as determined above (262).

In this manner, the method of FIG. 7 represents an example of a method of generating a file including video data including, in response to determining that a lowest track of a plurality of tracks, the lowest track including a base layer of video data carrying a lowest sub-layer of the video data, is to include sample entry type values for samples indicating that convenient random access is enabled, setting sample entry type values for samples of each of the other tracks of the plurality of tracks that include video data to indicate that convenient random access is enabled, and generating a file including the plurality of tracks, such that the sample entry type values for the tracks of the plurality of tracks indicate that convenient random access is enabled.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving video data, the method comprising:
    receiving data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, wherein the video data of the sample is included in a track of a plurality of tracks of a file, the plurality of tracks including a subset of the plurality of tracks including single-layer or multi-layer video data;
    in response to determining that convenient random access is enabled for one of the subset of the plurality of tracks having a lowest temporal sub-layer, determining that convenient random access is enabled for each of the plurality of tracks; and
    in response to the sample entry type being 'hev1' or 'hev2' and the sample comprising the video data encoded according to one of HEVC or L-HEVC, retrieving the sample to perform random access using the sample, without retrieving the video data of any of the one or more other samples that precede the sample, and without retrieving parameter sets of any previous samples of the video bitstream in decoding order.

2. The method of claim 1, further comprising receiving parameter sets that describe the sample at least one of in a sample entry corresponding to the sample or in the sample.

3. The method of claim 1, wherein the sample comprises the video data according to HEVC, and wherein the sample entry type is 'hev2'.

4. The method of claim 1, wherein the video data of the sample is included in a track of a file.

5. The method of claim 4, wherein the file includes a plurality of tracks, each of the tracks corresponding to a layer of L-HEVC.

6. The method of claim 1, wherein the video data of the sample is included in a track of a plurality of tracks of a file, the plurality of tracks including a subset of the plurality of tracks including single-layer or multi-layer video data, the method further comprising determining that each of the subset of the plurality tracks includes samples having sample entry types that indicate that convenient random access is enabled.

7. A device for retrieving video data, the device comprising:
    a memory configured to store video data; and
    one or more processors implemented in circuitry and configured to:
        receive data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, wherein the video data of the sample is included in a track of a plurality of tracks of a file, the plurality of tracks including a subset of the plurality of tracks including single-layer or multi-layer video data;
        in response to a determination that convenient random access is enabled for one of the subset of the plurality of tracks having a lowest temporal sub-layer, determine that convenient random access is enabled for each of the plurality of tracks;
        in response to the sample entry type being 'hev1' or 'hev2' and the sample comprising the video data encoded according to one of HEVC or L-HEVC, retrieve the sample to perform random access using the sample, without retrieving the video data of any of the one or more other samples that precede the sample, and without retrieving parameter sets of any previous samples of the video bitstream in decoding order; and
        store the retrieved sample to the memory.

8. The device of claim 7, wherein the processors are further configured to receive parameter sets that describe the sample at least one of in a sample entry corresponding to the sample or in the sample.

9. The device of claim 7, wherein the sample comprises the video data according to HEVC, and wherein the sample entry type is 'hev2'.

10. The device of claim 7, wherein the video data of the sample is included in a track of a file.

11. The device of claim 10, wherein the file includes a plurality of tracks, each of the tracks corresponding to a layer of L-HEVC.

12. The device of claim 7, wherein the video data of the sample is included in a track of a plurality of tracks of a file, the plurality of tracks including a subset of the plurality of tracks including single-layer or multi-layer video data, and wherein the processors are further configured to determine that each of the subset of the plurality tracks includes samples having sample entry types that indicate that convenient random access is enabled.

13. The device of claim 7, wherein the device is a wireless communication device, further comprising a receiver configured to receive the file.

14. The device of claim 13, wherein the wireless communication device is a cellular telephone and the file is received by the receiver and modulated according to a cellular communication standard.

15. A device for retrieving video data, the device comprising:
- means for receiving data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, wherein the video data of the sample is included in a track of a plurality of tracks of a file, the plurality of tracks including a subset of the plurality of tracks including single-layer or multi-layer video data;
- means for determining that convenient random access is enabled for each of the plurality of tracks in response to a determination that convenient random access is enabled for one of the subset of the plurality of tracks having a lowest temporal sub-layer; and
- means for retrieving the sample to perform random access using the sample in response to the sample entry type being 'hev1' or 'hev2' and the sample comprising the video data encoded according to one of HEVC or L-HEVC, without retrieving the video data of any of the one or more other samples that precede the sample, and without retrieving parameter sets of any previous samples of the video bitstream in decoding order.

16. The device of claim 15, further comprising means for receiving parameter sets that describe the sample at least one of in a sample entry corresponding to the sample or in the sample.

17. The device of claim 15, wherein the sample comprises the video data according to HEVC, and wherein the sample entry type is 'hev2'.

18. The device of claim 15, wherein the video data of the sample is included in a track of a file.

19. The device of claim 18, wherein the file includes a plurality of tracks, each of the tracks corresponding to a layer of L-HEVC.

20. The device of claim 15, wherein the video data of the sample is included in a track of a plurality of tracks of a file, the plurality of tracks including a subset of the plurality of tracks including single-layer or multi-layer video data, further comprising means for determining that each of the subset of the plurality tracks includes samples having sample entry types that indicate that convenient random access is enabled.

21. A non-transitory, computer-readable storage medium having stored thereon instructions that, when executed, cause a processor to:
- receive data describing a sample entry type for a sample of a video bitstream, the sample entry type being one of 'hev1' or 'hev2,' wherein the sample comprises video data encoded according to one of High-Efficiency Video Coding (HEVC) or layered HEVC (L-HEVC), and wherein one or more other samples including video data precede the sample in the video bitstream in decoding order, wherein the video data of the sample is included in a track of a plurality of tracks of a file, the plurality of tracks including a subset of the plurality of tracks including single-layer or multi-layer video data;
- in response to a determination that convenient random access is enabled for one of the subset of the plurality of tracks having a lowest temporal sub-layer, determine that convenient random access is enabled for each of the plurality of tracks; and
- in response to the sample entry type being 'hev1' or 'hev2' and the sample comprising the video data encoded according to one of HEVC or L-HEVC, retrieve the sample to perform random access using the sample, without retrieving the video data of any of the one or more other samples that precede the sample, and without retrieving parameter sets of any previous samples of the video bitstream in decoding order.

22. The non-transitory, computer-readable storage medium of claim 21, further comprising instructions that cause the processor to receive parameter sets that describe the sample at least one of in a sample entry corresponding to the sample or in the sample.

23. The non-transitory, computer-readable storage medium of claim 21, wherein the sample comprises the video data according to HEVC, and wherein the sample entry type is 'hev2'.

24. The non-transitory, computer-readable storage medium of claim 21, wherein the video data of the sample is included in a track of a file.

25. The non-transitory, computer-readable storage medium of claim 24, wherein the file includes a plurality of tracks, each of the tracks corresponding to a layer of L-HEVC.

26. The non-transitory, computer-readable storage medium of claim 21, wherein the video data of the sample is included in a track of a plurality of tracks of a file, the plurality of tracks including a subset of the plurality of tracks including single-layer or multi-layer video data, further comprising instructions that cause the processor to determine that each of the subset of the plurality tracks includes samples having sample entry types that indicate that convenient random access is enabled.

* * * * *